US006587736B2

(12) United States Patent
Howard et al.

(10) Patent No.: US 6,587,736 B2
(45) Date of Patent: Jul. 1, 2003

(54) DISTRIBUTED OBJECTS FOR A COMPUTER SYSTEM

(75) Inventors: Michael L. Howard, Sandy, UT (US); William R. Harper, Jr., Salt Lake City, UT (US)

(73) Assignee: emWare, Inc., Salt Lake City, UT (US)

( * ) Notice: Subject to any disclaimer, the term of this patent is extended or adjusted under 35 U.S.C. 154(b) by 16 days.

(21) Appl. No.: 10/006,438

(22) Filed: Nov. 20, 2001

(65) Prior Publication Data

US 2002/0069258 A1 Jun. 6, 2002

Related U.S. Application Data

(63) Continuation of application No. 09/276,986, filed on Mar. 26, 1999, now Pat. No. 6,370,436.

(51) Int. Cl.$^7$ .............................................. G06F 15/16
(52) U.S. Cl. ........................... 700/2; 709/201; 709/203
(58) Field of Search .......................... 700/2, 9, 231; 709/200, 201, 203, 213, 216, 223–226

(56) References Cited

U.S. PATENT DOCUMENTS

| | | | |
|---|---|---|---|
| 5,608,727 A | 3/1997 | Perreault et al. ............ 370/462 |
| 5,652,888 A | 7/1997 | Burgess ....................... 395/683 |
| 5,732,261 A | 3/1998 | Savitzky et al. ............. 395/614 |
| 5,742,826 A | 4/1998 | Endicott et al. ............. 395/683 |
| 5,751,962 A | 5/1998 | Fanshier et al. ....... 395/200.53 |
| 5,754,862 A | 5/1998 | Jones et al. ................. 395/705 |
| 5,761,692 A | 6/1998 | Ozden et al. .................. 711/4 |
| 5,774,721 A | 6/1998 | Robinson ..................... 395/683 |
| 5,784,620 A | 7/1998 | Isham ......................... 395/683 |
| 5,790,789 A | 8/1998 | Suarez .................. 395/200.32 |
| 5,805,442 A | 9/1998 | Crater et al. ................ 364/138 |
| 5,805,869 A | 9/1998 | Smith et al. ................. 395/507 |
| 5,893,913 A | 4/1999 | Brodsky et al. ............ 707/201 |
| 5,918,051 A | 6/1999 | Savitzky et al. ............ 395/683 |
| 6,016,514 A | 1/2000 | Cink et al. ................... 709/300 |
| 6,073,184 A | 6/2000 | Couturier et al. ........... 709/313 |
| 6,353,860 B1 * | 3/2002 | Hare et al. .................. 709/316 |

OTHER PUBLICATIONS

Daniel Bahr, "Network Design: The Next Generation", LAN Magazine, Jul. 1996, pp. 1–9.
Curtis Green, "Hardware Modelling in C++", Embedded Systems Programming, Oct. 1995, pp.1–30.
Bertrand Meyer, "Object–oriented Software Conformation", Prentice–Hall, Inc., Upper Saddle River, New Jersey (date unknown).

* cited by examiner

Primary Examiner—Paul P. Gordon
(74) Attorney, Agent, or Firm—Madson & Metcalf

(57) ABSTRACT

A distributed object for use in a networked computer system including a host computer and a remote computer, where the remote computer is in electronic communication with a device, is disclosed in one embodiment of the present invention as including a first member component implemented and stored on the host computer, and a second member component implemented and stored on the host computer. The second member component is in electronic communication with the remote computer, and the second member component functions to access data on the remote computer. The distributed object may be part of an object hierarchy. The object hierarchy includes a base class having member data and functions common to a set of remote computers, where the base class is implemented and stored on the host computer. The object hierarchy may also include a first subclass derived from the base class. The first subclass may be implemented and stored on the host computer. This first subclass includes the second member component in electronic communication with the remote computer. The object hierarchy may also include a second subclass that alters the function of the object.

93 Claims, 7 Drawing Sheets

DISTRIBUTED OBJECTS FOR A COMPUTER SYSTEM

CROSS-REFERENCE TO RELATED APPLICATION

This application is a continuation of U.S. patent application Ser. No. 09/276,986 filed Mar. 26, 1999, now U.S. Pat. No. 6,370,436 issued Apr. 9, 2002.

BACKGROUND

1. The Field of the Invention

This invention relates to computer software and, more particularly, to novel systems and methods for distributing computer software and data across a computer network.

2. The Background Art

In recent years there has been a great increase in the amount of computer technology that is involved in daily life. In today's world, computer technology is involved in many aspects of a person's day. Many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

The small computers, (which can be rather large computers depending on the particular need which is being met by the computer), almost always have one or more processors at the heart of the computer. The processor(s) usually are interconnected to different external inputs and outputs and function to manage the particular device. For example, a processor in a vending machine for soda pop may be connected to the buttons used to select the pop, to the switch that allows a pop to drop down to a user, and to lights to indicate that the machine does not have any more pop of a particular variety.

Computer technology is involved in many aspects of daily life. Many appliances, devices, etc., include one or more small computers. For example, refrigerators, telephones, typewriters, automobiles, vending machines, and many different types of industrial equipment all have small computers, or processors, inside of them. Computer software runs the processors of these computers and tells the processors what to do to carry out certain tasks. For example, the computer software running on a processor in a vending machine may cause a soda pop to drop to a user when the correct change has been entered by a user.

These types of small computers that are a part of a device, appliance, tool, etc., are often referred to as embedded systems. The term "embedded system" usually refers to computer hardware and software that is part of a larger system. Embedded systems usually do not have typical input and output devices such as a keyboard, mouse, and/or monitor. Usually, at the heart of each embedded system is one or more processor(s).

Typically the embedded systems used today with various appliances, devices, etc., do not have a lot of storage capability. As a result, the amount of data that can be stored on the embedded systems is limited. With only limited storage, an embedded system may not have as many features and capabilities as it could have if it had more available storage.

Some embedded systems have been connected to computer networks to allow some communication between the embedded system and a larger computer system. However, because embedded systems are often not equipped with the functionality to effectively and efficiently communicate with other computer systems, the communication capability is usually limited.

Because of the constrained memory resources on the embedded systems, often only limited interaction from a computer network with the embedded system is available. This interaction is often of limited use because of the difficulty in communicating with the different parts of the embedded system.

BRIEF SUMMARY AND OBJECTS OF THE INVENTION

In view of the foregoing, it is a primary object of the present invention to distribute services of an embedded system across a larger computer system.

It is also an object of the present invention to increase the functionality of an embedded system.

Further, it is an object of the present invention to increase the effective storage capability of data related to the embedded system.

It is also an object to increase the communications capabilities of an embedded system.

It is yet a further object of the present invention to enhance the ability of a larger computer system to interact and interface with an embedded system.

Consistent with the foregoing objects, and in accordance with the invention as embodied and broadly described herein, a method and apparatus for use in a networked computer system including a host computer and a remote computer, where the remote computer is in electronic communication with a device, are disclosed in one embodiment of the present invention as including a first member component implemented and stored on the host computer, and a second member component implemented and stored on the host computer. The second member component is in electronic communication with the remote computer, and the second member component functions to access data on the remote computer.

An apparatus made in accordance with one embodiment of the invention may include a distributed object as being a part of an object hierarchy. This object hierarchy may include a base class including member data and functions common to a set of remote computers, where the base class is implemented and stored on the host computer. The object hierarchy may also include a first subclass derived from the base class. The first subclass may be implemented and stored on the host computer. This first subclass includes the second member component in electronic communication with the remote computer. The object hierarchy may also include a second subclass that alters the function of the object.

A method practiced in accordance with an embodiment of the invention may include the steps of providing application code on the remote computer, where the application code provides services related to the device; exporting an enumeration of services to the host computer, where the enumeration is a subset of the services; encapsulating the enumeration of the services; and accessing a service at the remote computer through the encapsulation of the services. The method may also include the step of creating a services list on the remote computer, where the list includes information about certain services.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 7, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

Figure 1:
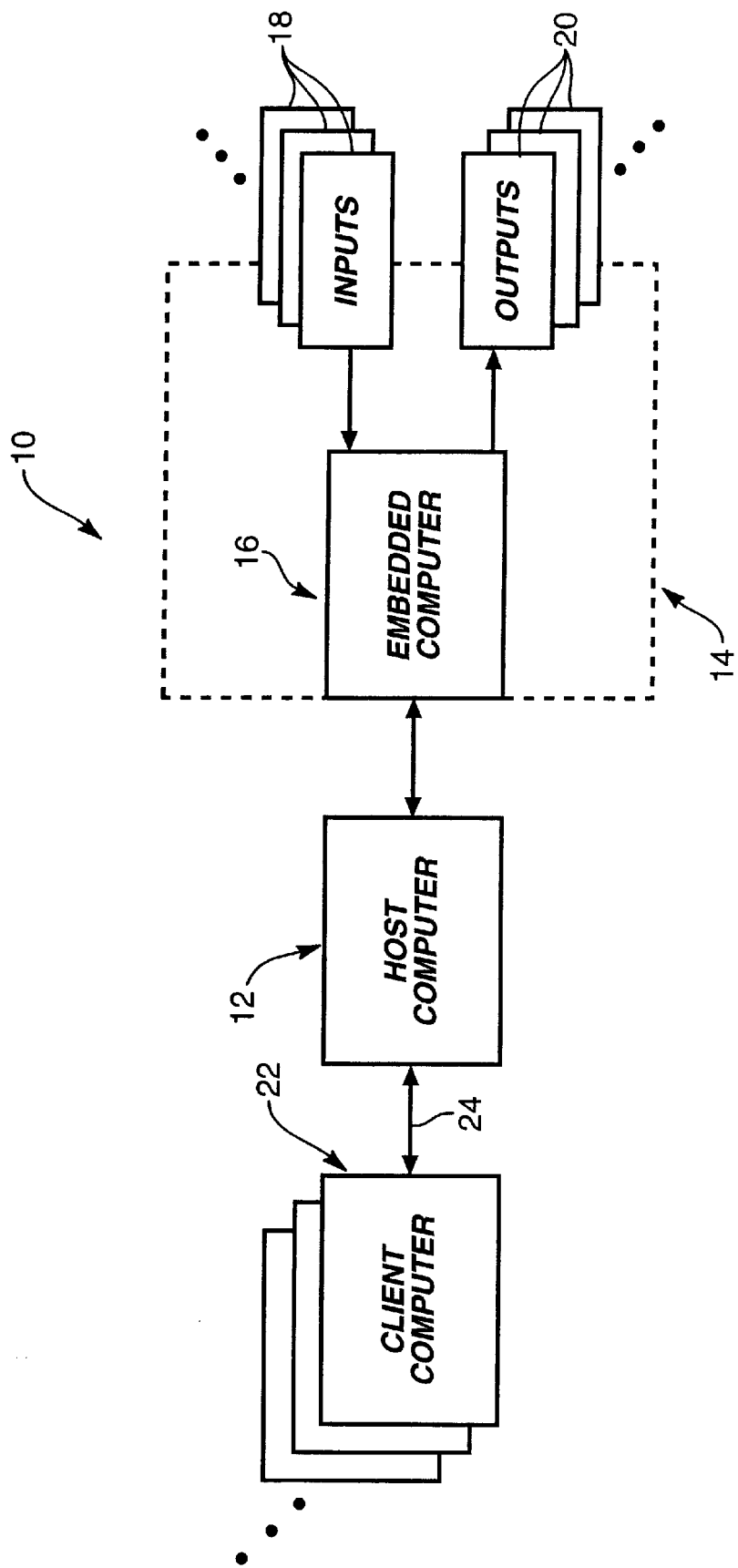
FIG. 1 is block diagram of the major hardware components included in the presently preferred embodiment of the present invention.

FIG. 1 is block diagram illustrating the major hardware components typically utilized in the presently preferred embodiment of the present invention. In the presently preferred embodiment, the present invention is used in a networked computer system 10 where a host computer 12 is connected to an embedded device 14. Typically the embedded device 14 includes a computer 16 connected to input and output devices 18, 20. The computer 16, in the presently preferred embodiment, is an embedded computer 16. Particularly, in the presently preferred embodiment, the computer 16 comprises a microcontroller (not shown). However, it will be appreciated by one skilled in the art that the functions and processing normally carried out by a microcontroller could be carried out by larger processors, whether they are part of a larger controller or part of a typical computer system. The embedded computer 16 is remote from the host computer 12, in that the embedded computer 16 and host computer 12 are each computers capable of functioning on their own. The term remote does not necessarily mean that the embedded computer 16 is at a different location than the host computer 12, although in many embodiments of the present invention the host computer 12 is at a different location than the embedded computer 16. The terms embedded computer 16 and remote computer 16 may be used interchangeably herein. Those elements discussed as being stored and/or implemented by the remote computer 16 could be stored and/or implemented at the host computer 12, in some circumstances.

The present invention has a broad application to many kinds of computer networks 10. Generally, the computer system 10 in which the presently preferred embodiment of the present invention also includes one or more client computers for monitoring and/or controlling the embedded device 14. The remote computer 16 is operably connected to input and/or output devices 18, 20 capable of electronic communication with the remote computer 16, or, in other words, to devices 18, 20 capable of input and/or output in the form of an electrical signal. Sometimes the input and output device(s) 18, 20 and the remote computer 16 are both housed within the same physical structure.

The host computer 12 and the remote computer 16 are both broadly defined digital computers. A computer, as used herein, is any device that includes a digital processor capable of receiving and processing data. A computer includes the broad range of digital computers including microcontrollers, hand-held computers, personal computers, servers, mainframes, supercomputers, and any variation or related device thereof.

The input and output devices 18, 20 include any component, element, mechanism, appliance, or the like capable of receiving and/or generating an electronic signal. Examples of devices within the scope of the term device includes a vending machine, a telephone, a door lock, a temperature sensor, a motor, a switch, and a light.

In current design, the host computer 12 is typically an IBM-compatible personal computer running the Microsoft Windows 95 or 98 operating system. The remote computer 16 typically includes an embedded processor (not shown), and, as stated, often includes a microcontroller. The devices 18, 20 can be any devices with electronic interfaces of which a processor could interface and interact with. One possible item that may be used with the present invention is a vending machine (not shown). Many vending machines include one or more microcontrollers for controlling different parts of the vending machines. These microcontrollers fall within the scope of remote computer 16. The input and output devices 18, 20 include the buttons for selecting items from the vending machine, switches for allowing those items to be dropped down to the user, lights for indicating which items are gone, the change release for releasing any change, etc. As known in the art, this vending machine embodiment includes the input and output devices 18, 20 and the remote computer(s) 16 integrated within the same structure. The present invention, therefore, may be implemented in such an environment. Those skilled in the art will also realize that the remote computer 16 may be in a separate structure from its attached input and output device(s) 18, 20. Many of the modern devices do come with embedded microcontrollers, for example, many cellular phones, pagers, and the like come with embedded microcontrollers.

The host computer 12 may be connected to the remote computer 16 through a variety of connections, including RS 232, RS 485, modem, powerline, wired connection, wireless connection, etc. Similarly, the remote computer 16 may be connected to various input and output devices 18, 20 through a variety of ways. As stated, typically the remote computer 16 comprises a microcontroller (not shown). Microcontrollers often have input/output ports for communicating with external devices. These specifications of the particular microcontroller often dictate how a device is connected to the microcontroller. Those skilled in the art appreciate how different devices may be connected to computers, whether they are embedded computers, standard desktop computers, mainframes, etc.

As stated, client computers 22 may also be included within the computer system 10. Such a configuration allows users to access services at the remote computer 14 through the host computer 12, even over great distances. The host computer 12 and the client computers 22 may all be connected together on a computer network 24, such as a LAN, WAN, etc. In addition, the client computer 22 may connect from a remote location to the host computer 12 via a dial up connection, via an intranet, or via the Internet.

Figure 2:
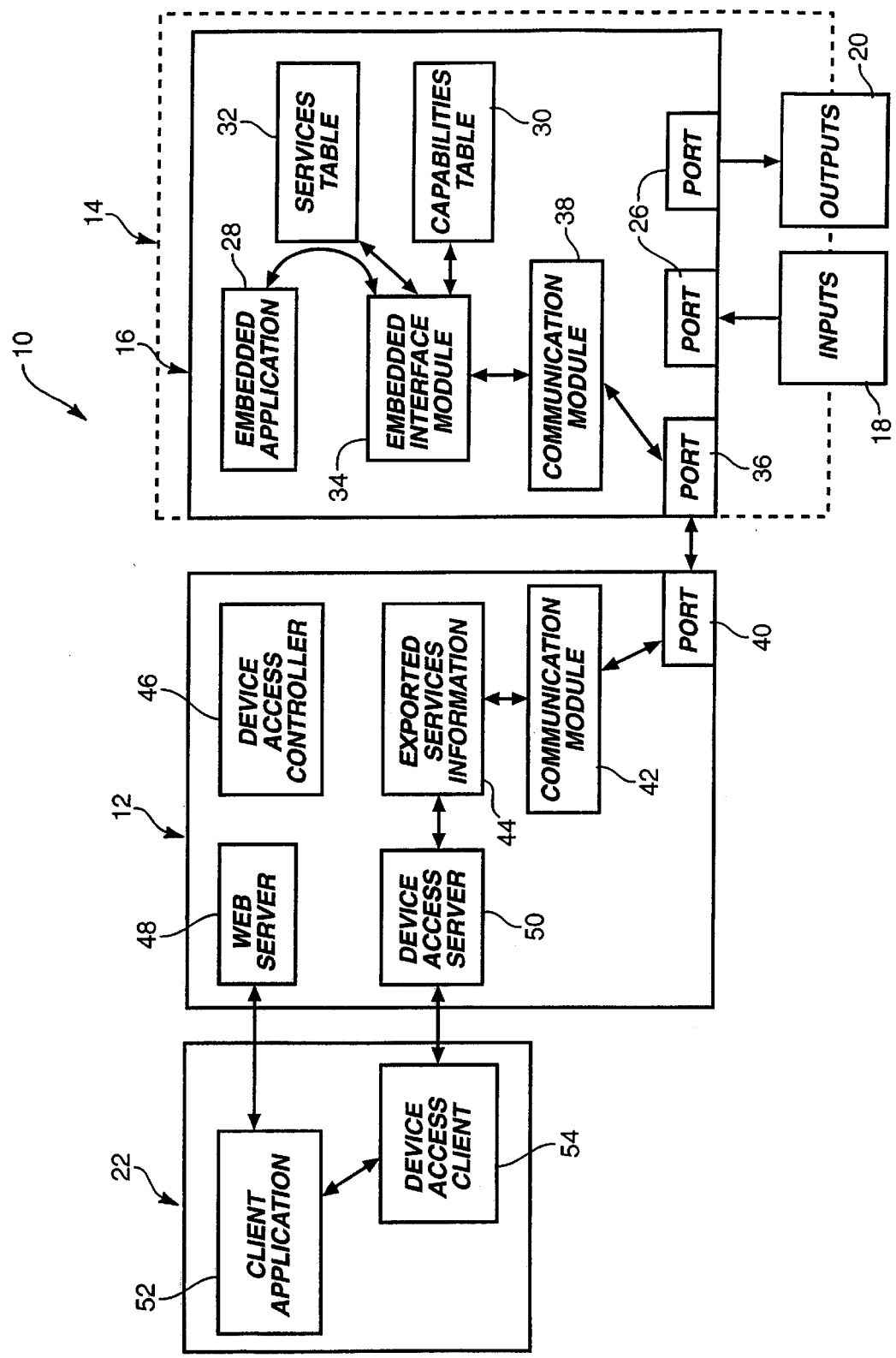
FIG. 2 is block diagram of the major hardware and software components included in an embodiment of the present invention.

FIG. 2 depicts a block diagram of the major hardware and software components of the presently preferred embodiment of the present invention. As shown, the hardware elements of FIG. 2 correlate with those of FIG. 1. Those skilled in the art will appreciate that there are a variety of ways to interconnect the various hardware components, and that there are various configurations wherein one or more of the hardware elements may be eliminated by moving functionality from one hardware element to another.

The present invention enables a user to monitor and/or control services provided by the embedded computer 16 through a host computer 12. The services of the embedded computer 16 are exposed by the present invention such that they may be accessed over the computer network 10 and in an efficient manner.

In the presently preferred embodiment of the present invention, data from input and/or output devices 18, 20 is read in and/or written out through input/output ports 26. An embedded application program 28 includes the executable instructions that directly interface with these input and/or output ports 26. Usually embedded applications 28 have a main loop which is iterated through over and over. Of course, embedded application developers may write an application that does not have a main loop that is continually iterated through. The principles of the present invention could be applied to those applications not having a main loop and provide substantially the same benefits as are realized in the presently preferred embodiment.

Basic information about the embedded or remote computer 16, its characteristics and capabilities are useful in practicing the present invention. Such basic information may be stored at the remote computer 16 in a capabilities table 30. The capabilities table 30 may be stored as a file, or it may be stored as static data that is compiled with the application 28, or it may be stored on a storage device (not shown) external to the remote computer 16. Those skilled in the art will realize that there are a variety of ways to store basic capabilities of a remote computer 16 and its connected input and/ore output devices 18, 20. Table 1 contains pseudocode illustrating what types of information may be stored in the capabilities table 30.

TABLE I

| 1A | byte ordering type |
|---|---|
| 1B | device identification |
| 1C | device address |
| 1D | software version |
| 1E | communication protocol version |
| 1F | maximum communication packet size |
| 1G | nonvolatile storage flag (indicates yes or no) |

TABLE I-continued

| 1H | nonvolatile storage size, starting address |
|---|---|
| 1I | static file system flag |
| 1J | dynamic file system flag |

As illustrated in Table 1, the capabilities table may include indicate the byte order type shown at line (1A). This byte ordering type (1A) may indicate whether the remote or embedded computer 16 is big endian or little endian. The table may also indicate what the device identification, shown at line (1B), is for that particular remote or embedded computer 16. The device address, shown at line (1C), if any, may also be stored in the capabilities table 30. For compatibility purposes, the version numbers, shown at line (1D), for the software being used may also be stored. Similarly the communication protocol version numbers, shown at line (1E), may also be stored. Particulars about the communication may also be stored. For example, as shown in Table 1, the maximum communication packet size, shown at line (1F), may be stored. A nonvolatile storage flag shown at line (1G) may indicate whether there is nonvolatile storage accessible by the remote computer 16. Pertinent information about the nonvolatile storage may also be stored, such as the nonvolatile storage size and its starting address, shown at line (1H). A static file system flag, shown at line (1I), may indicate whether there is a static file system. Similarly, a dynamic file system flag, shown at line (1J), may indicate whether there is a dynamic file system. The capabilities table 30 is useful in that software at the host computer 12 can request the capabilities table 30 and ascertain the characteristics and capabilities of the embedded computer 16.

Users, through software running on the client computer 22 and/or the host computer 12, may wish to access certain services provided by the remote embedded computer 16. Services include different functions, variables, events, and/or files. For example, users may wish to execute particular functions, access certain variables, check on specified events, or access specific files. In current design, the services that a user may need access to are identified and listed. The identification of services also includes information about the certain services. This identification of certain services may be accomplished in a variety of ways. For example, in current design, a table 32 of services may be stored at the remote computer 16. The services table 32 may be stored as a file, or it may be stored as static data that is compiled with the application, or it may be stored on a storage device (not shown) external to the remote computer 16. Those skilled in the art will realize that there are a variety of ways to store basic information about certain services provided by the application code 28 running on the embedded computer 16. Table 2 contains pseudocode illustrating what types of information may be stored in the services table 32.

TABLE 2

| 2A | "FunctionA", function, word, void, &FunctionA |
|---|---|
| 2B | "FunctionB", function, int, float, &FunctionB |
| 2C | "VarA", variable, int, void, &varA |
| 2D | "VarB", variable, string, void, &varB |
| 2E | "EventA", event, byte, void, &eventA |
| 2F | "EventB", event, int, void, null |
| 2G | "FileA", file, void, void, &fileA |
| 2H | "FileB", file, void, void, &fileB |

As illustrated in Table 2, the services table 32 may include information such as the name or identification of the service, the type of service (e.g., whether it is a function, variable, event, file, etc.), the input parameter type, if any, the return type, if any, and the address of the service. Information about function FunctionA, shown at line (2A), is illustrated indicating that it is a function, it takes a word as an input parameter, it returns nothing (void), and its address is indicated at & FunctionA. Line (2B) illustrates the information about another function, FunctionB. Relevant information about variables are illustrated at lines (2C)-(2D). Information about events is illustrated at lines (2E)-(2F). Events may be any type of data. For example, an event could be a variable, a particular register, an interrupt, etc. Events may be particularly useful for items that occur asynchronously. Examples of asynchronous types of events include an alarm going off or an external LED changing. Information about certain files are illustrated at lines (2G) and (2H).

By storing information about certain services at the remote computer 16, software on the host computer 12 can readily ascertain what services are available at the remote computer 16. Usually the application code 28 defines the services. The services table 32 functions to provide information about certain services, where the information would be useful to a user at the host computer 12, or to a user at the client computer 22 connected thereto.

In current design, an embedded interface module 34 provides access between the services at the remote computer 16 and software running at the host computer 12. In the presently preferred embodiment, the interface module 34 uses information in the services table 32 to access the desired service on the remote computer 16. Further, in the presently preferred embodiment, the interface module 34 is reentrant code.

The interface module 34 communicates through an embedded communications port 36. In current design, a communications module 38 provides communication using the communications port 36. One skilled in the art will appreciate, however, that the interface module 34 may include the code necessary to directly interface with the communications port 36 at the remote computer 16. The communications module 38 or code 38 provides access to the communications port 36, and ensures that data is given to the communications port 36 in appropriately sized and formatted pieces, and that data received from the communications port 36 is correctly read from the port 36.

The host computer 12 includes a communication port 40 in electronic communication with the communications port 36 of the remote computer 16. As discussed earlier, there are a variety of such ports available with computers that are capable of interfacing with a remote and/or embedded computer port 36. A communication module 42 provides features similar to those provided by the communications module 38 of the remote computer 16. The communications module 42 correctly formats data that is written to and read from the communications port 40.

The host computer 12 provides access to the services provided at the embedded computer 16. In the presently preferred embodiment of the present invention, the services table 32 is retrieved from the embedded computer 16 and from it 32 a list of the services is created at the host computer 12 that substantially corresponds to the services table 32. The list of services at the host computer 12 is referred to in FIG. 2 as exported services information 44. The exported services information 44 indicates what services are available at the remote computer 16 and what data types, if any, are used with individual services. This facilitates access via the host computer 12 to the remote or embedded computer 16.

In current design, a process is initially started on the host computer 12 that causes the exported services information 44 to be created. The device access controller 46 provides this initial direction, in current design.

As stated, the presently preferred embodiment of the present invention may provide access to the services of the embedded computer 16 to client computers 22 that are in electronic communication with the host computer 12. To facilitate access by client computers 22, the host computer 12 may include servers. A web server 48 may be started at the host computer 12. The web server 48 may provide a web interface to services at the remote computer 16. For example, the data and/or services of the remote computer 16 may be represented graphically through HTML pages. Thus, the device access controller 46, may create web pages (not shown) from the services available at the remote computer 16, and the web server 48 may service HTTP requests for these web pages.

A device access server 50 may also be included at the host computer 12 to service client requests for services of the remote computer 16. In current design, the device access server 50 accesses the exported services information 44 and makes this information available to clients at client computers 22.

A client computer 22 may include a client application 52 and a device access client 54. The device access client 54 communicates with the device access server 50 to access the services of the remote computer 16. The client application 52 may use the device access client 54 to obtain information about the services. The client application 52 could also access data from the web server 48 located at the host computer 12. For example, the client application 52 may be a web browser capable of connecting to the web server 48.

Figure 3:
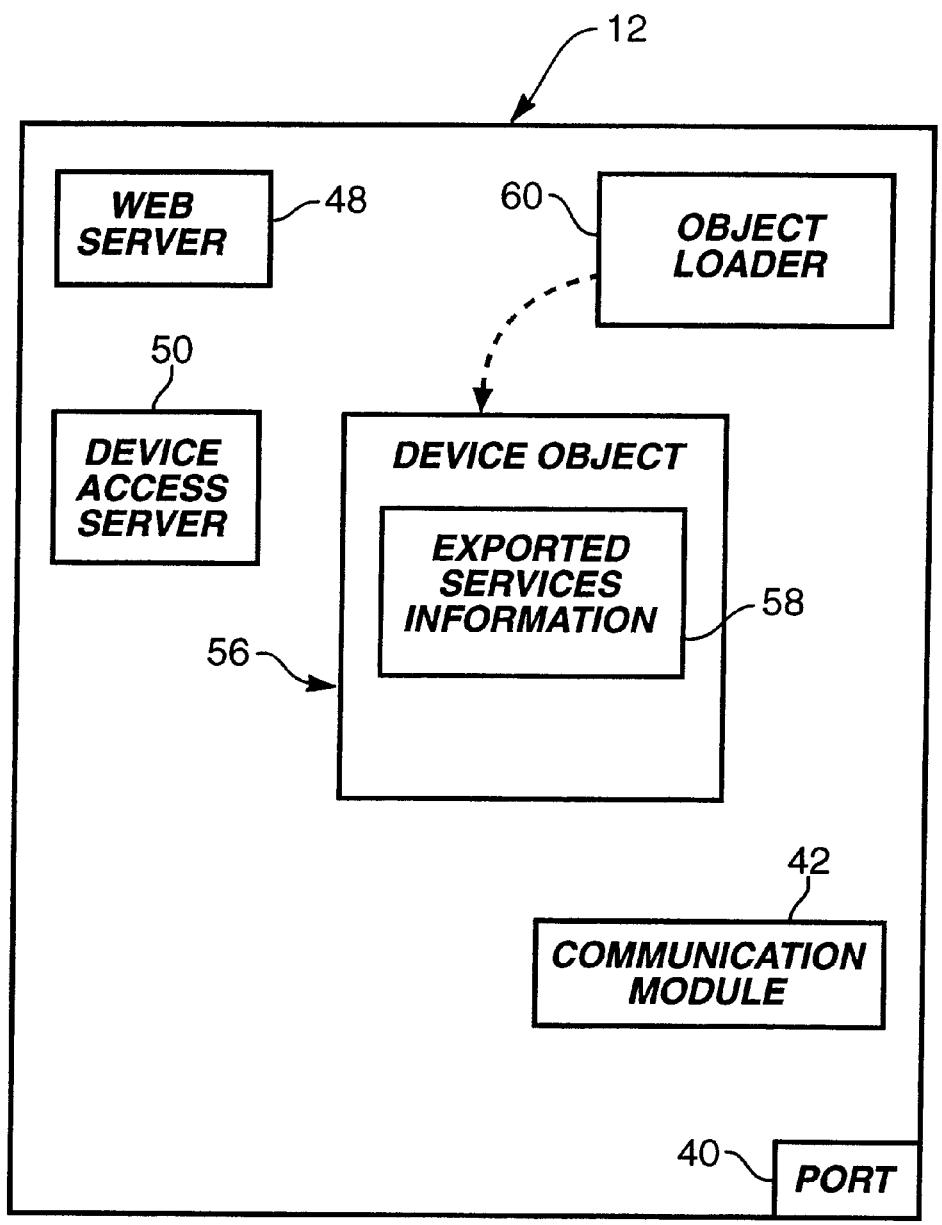
FIG. 3 is block diagram of the major hardware and software components included in the presently preferred embodiment of the present invention.

Referring to FIG. 3, the presently preferred embodiment of the present invention is shown with an object implementation whereby the exported services information is encapsulated. Users of the present invention may encapsulate the list of services of the remote computer 16 by using a software object 56 at the host computer 12. An object 56 of the presently preferred embodiment of the present invention is stored and implemented on the host computer 12. The object 56 provides an object representation of at least part of the remote computer system 14, where the remote computer system 14 includes both the remote computer 16 and its connected devices 18, 20. Part of the object 56 is used mainly to access the services provided by the remote computer 16. By implementing the object 56 on the host computer 12, developers are provided with the many benefits of object-oriented analysis and design without using valuable memory resources on the remote computer 16 to provide these benefits. In current design, only items necessary for storage on the remote computer 16 are stored at the remote computer 16. Of course, it will be appreciated by those skilled in the art that, if the remote computer 16 did have access to a substantial amount of memory, many more items could be stored at the remote computer 16.

An object 56 is a description of a data structure. An object 56, as used herein, is an abstract data type that encapsulates data and/or functions. Accordingly, one skilled in the art could implement a data structure equivalent to an object 56, without using object-oriented features of certain programming languages. Specifically, an object 56 as used herein does not require that software developers use object-oriented languages such as C++ or Smalltalk. An object 56 within the scope of the present invention could be implemented in any programming language. For example, an object 56 could be implemented in C, C++, Pascal, FORTRAN, assembly language, etc. In current design, the C programming language is being used.

The member components (functions, variables, data, etc. that are encapsulated by the object 56) of the object 56 are stored on the host computer 12. A member component of the object 56 may be either a member function or member data. In the presently preferred embodiment, several member functions, or methods, and several data members, or attributes, are stored on the host computer 12. Although the member components, as defined by the class definition of the object 56, are stored on the host computer 12, the member components may access services of the remote computer 16: the object 56 may provide access to functions, variables, events, and/or files of the remote computer system 14.

To provide the benefits of the present invention, at least one member component of the object 56, implemented and stored on the host computer 12, is in electronic communication with the remote computer 16 and is used to access data on the remote computer 16. Accessing data may be retrieving data from the remote computer 16, changing data that is stored at the remote computer 16, or it may be causing code on the remote computer 16 to be executed.

In current design, the object 56 functions in part to mirror data and/or functions and/or events of the remote computer 16. The object 56 includes data and or functions that correspond to the services at the remote computer 16. The services table 32 and the exported services information 58 enable the object 56 to relate or expose the services of the remote computer 16 to software running on the host computer 12 and/or software running on client computers 22. In this way, part of the data and/or functions of the remote computer 16 is distributed across the computer network 10. In the presently preferred embodiment, only the necessary data is stored at the remote computer 16, and only the executable code necessary to be stored on the remote computer 16 is stored on the remote computer 16. Data and functions representative of the remote computer system 14 are distributed between the remote computer 16 and the host computer 12 to minimize the resources necessary at the remote computer 16. The object 56 provides the benefits of object-oriented analysis and design to developers and also provides access to data and functions natively residing in the remote computer system 14. Thus, the data and functions provided by the object 56 are distributed between the host computer 12 and the remote computer system 14 but are all accessible through the object 56 at the host computer 12.

In the presently preferred embodiment of the present invention, the object 56 is part of an object hierarchy. The object hierarchy will be discussed in relation to FIG. 4.

The system used in combination with FIG. 3 may be substantially similar to the system 10 shown in FIG. 2. The software modules of the host computer 12 may be modified to include the device object 56 and an object loader 60.

The object loader 60 creates the device object 56. The following tables of pseudocode and explanation relating thereto will provide further details of the device object 56 and the device object loader 60. The tables contain pseudocode written with the C programming language as a target language in which to implement the pseudocode. It will be appreciated by those skilled in the art that almost any programming language could be used in implementing the present invention.

In the presently preferred embodiment, the device object loader 60 takes a description of a device object 56 and creates an instance of that object 56. This instance includes the exported services information 58 contained therein. In the pseudocode that follows, the instance of the device object 56 includes tables for all of the services that have been exported from the remote computer 16 and that are available to the host computer 12. As will be discussed more with FIG. 4, services of base objects can be overridden by objects that inherit that base object when that particular object is loaded and/or instantiated.

In the pseudocode, the object hierarchy will be instantiated base object first, so that the base object will be the first object to initialize. Once the device object loader 60 has completed it's task of loading all of the device objects 56 for that particular device object instance, it will be ready for use by other software routines.

Table 3 illustrates a data structure that may be used for the device object 56. As illustrated, hash tables are used as tables for storing the exported services information 58. The pseudocode of Table 3 also shows a separate hash table for each type of service exported, including variables, events, functions, and files. One skilled in the art will appreciate how a hash table, or hashing, may be implemented.

TABLE 3

```
typedef <A hash table implementation>HASH;
typedef <a string definition>PTSTR;
typedef unsigned long DEV_OBJECT_HANDLE;
typedef struct_DeviceObject{
    HASH VarServiceTable;      /* Variable Services Table */
    HASH EventServiceTable;    /* Event Services Table */
    HASH FuncServiceTable;     /* Function Services Table */
    HASH FileServiceTable;     /* File Services Table */
    PTSTR DeviceObjectName;    /* The Full String Name of this
                                  object */
}DeviceObject;
```

Table 4 illustrates the different functions that may be performed for a variable. Of course, the same types of functions may also be provided with events, functions, and files. The principles of the illustration of Table 4 can be applied to the variables table, as shown, as well as to events, functions, and files. As illustrated in Table 3, hash tables may be used for storing the exported services information 58. Table 4 includes pseudocode showing the different functions that may be provided and performed for each variable in the variable table. In operation, after the services table 32 has been exported to the host computer 12, the host computer 12 then has exported services information 58. The exported services information 58 typically includes variables. Table 4 illustrates that, in current design, the code running on the host computer 12 will be given the ability to get a variable value, set a variable value, get information about the variable, and subscribe to the variable. The same capabilities can be provided in relation to functions, events, and files.

TABLE 4

```
typedef unsigned long SERVICE_STS;
typedef enum {
  VAR_GET,          /* Get the variables Value */
  VAR_SET,          /* Set the Variables Value */
  VAR_INFO,         /* Get information about this variable */
  VAR_SUBSCRIBE     /* Subscribe to this variable */
}VAR_SERVICE_CMD;
/* This is the definition of the variable service accessing function */
typedef SERVICE_STS (*PFVarService)
(DEV_OBJECT_HANDLE This,
VAR_SERVICE_CMD Cmd, PTSTR ServiceName, . . .);
typedef struct_VarServiceEntry{
  DEV_OBJECT_HANDLE ThisHandle; /* Handle to this Object */
  PEVarService VarService;       /*Pointer to the service assessor
function*/
  PTSTR VarServiceName;          /* The name of this service */
  BOOL Final;       /* Flag to tell if this service can be overridden */
```

TABLE 4-continued

```
BOOL Protected;       /* Flag that makes this service only useable from
                      ** inherited objects */
BOOL Virtual;         /* Flag that means that this service is defined but not
                      ** implemented and must be implemented
                                                        by inherited
                      ** objects in order for the object to
                                                 be instantiated */
_VarServiceEntry* NextEntry;    /* The next varservice entry
                                   that was overridden
                                   **by this entry */
}VarServiceEntry;
```

When the object is first created, in current design, the device object 56 is filled starting with the base object first. With the pseudocode illustrations, each of the hashes in the device object table will be filled with that object's services. When the base object is initialized, all of its variables may be placed within the VarServiceEntry. Accordingly, the final device object reference will contain the base objects VarServiceEntry table and can be manipulated through the function pointer, VarService. In the presently preferred embodiment, the entries in the tables can only be overridden if the Final flag in the VarServiceEntry table is FALSE. This allows the base object to implement services that cannot be overridden by inherited objects. If the service can be overridden, an inherited object can override the service by creating a new table and inserting it into the VarServiceTable with the same name. The NextEntry pointer in the VarServiceEntry table allows the overridden service to still be accessed by the inherited objects. The other flags available are the Protected and Virtual flag. The Protected flag indicates that when true only inherited objects can utilize this service, not the owner of the object. The Virtual flag indicates that the interface is not implemented in this object and must be implemented in inherited objects in order for the device object to be instantiated.

Table 5 includes pseudocode for the object loader 60. The object loader 60 takes a string definition of the object and creates the object. Each object's initialization routine places its services into the device object table. After the object loader 60 has loaded the objects, the device object 56 is created and can be used to manipulate the embedded system 14, including the remote computer 16 and its input and/or output devices 18, 20. In other words, after the device object 56 is created, it can be used to access the services at the remote computer 16.

TABLE 5

```
DeviceObject* Load DeviceObject(PTSTR DeviceObjectDescriptor){
PTSTR* ObjectNameList;
int i;
int NumberOfObjects;  /* Number of Objects in the ObjectNameList */
/* Parse the String Device object descriptor into
each particular piece and place
** each piece into the ObjectNameList
*/
ParseDeviceObjectDescriptor(DeviceObjectDescriptor, ObjectNameList);
/* Allocate a new Device Object Structure */
DeviceObject* NewObject = MallocNewDeviceObject( );
/* Initialize any data structures within the device object */
InitDeviceObject(NewObject);
/* Loop over all of the objects in the hierarchy
initializing each one individually */
for(i = 0; i < NumberOfObjects; i++){
  DLL_HANDLE DeviceObjectDll; /* Handle to a loaded Dll */
  PFDeviceObjectDllInit DeviceObjectInit;
  /*Ptr to Object Initialization routine*/
```

TABLE 5-continued

```
  DWORD Sts;
  PTSTR ObjectName = ObjectNameList[i];  /* Get this objects name */
  DeviceObjectDll = FindDeviceObjectDll(ObjectName)
  /*Find dll for this object*/
  /* Retrieve the Initialization routine function pointer */
  DeviceObjectInit = GetFunctionPtr(DeviceObjectDll);
  /* Have the Device Object fill it's Services
  into the Device Object Table */
  Sts = DeviceObjectInit(NewObject);
}
return NewObject;
}
```

The device access server 50, and/or the web server 48, and/or other software needing access to the services of the remote computer 16 may access the device object 56 to access the exported services information 58.

Figure 4:
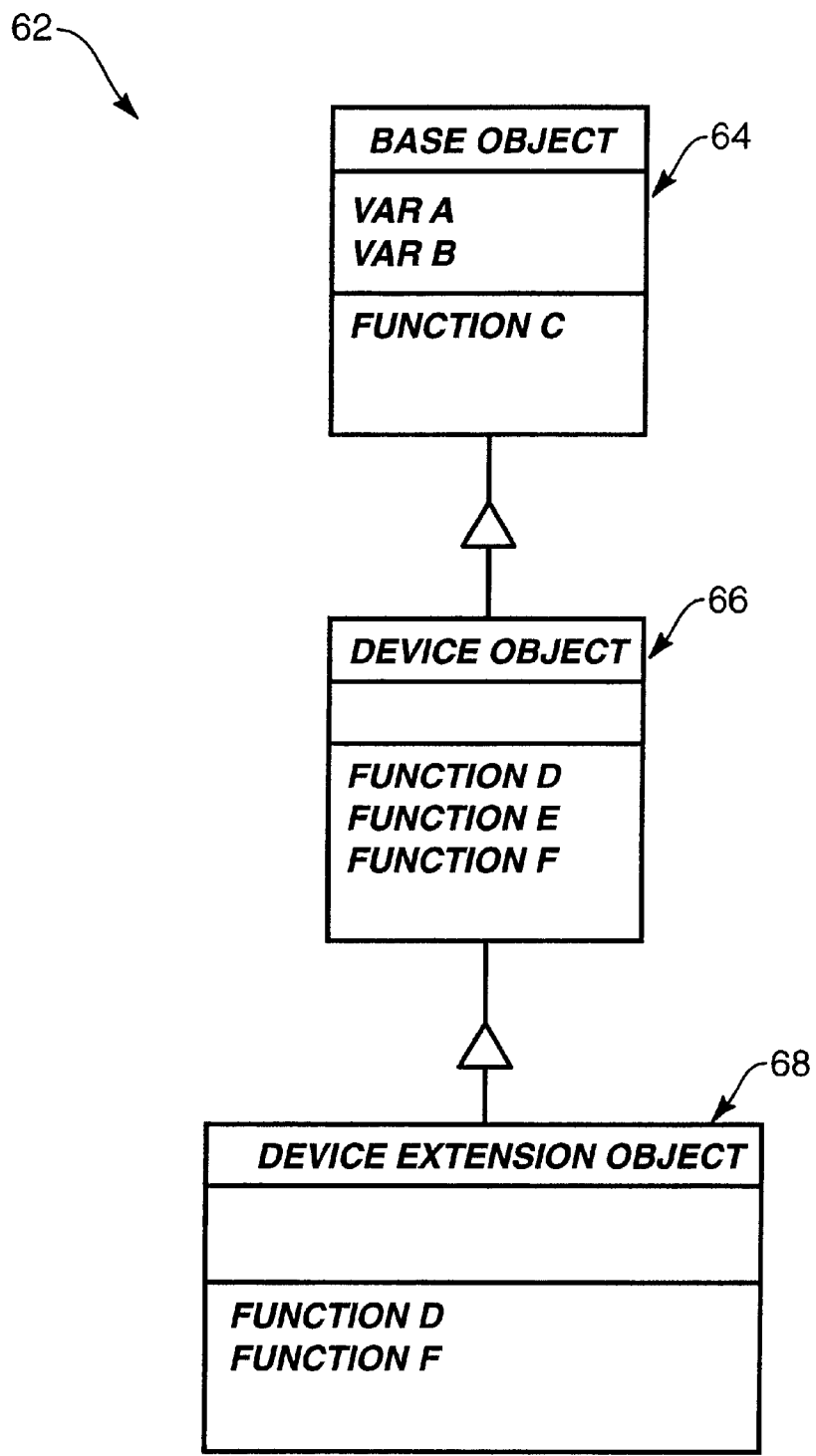
FIG. 4 is an object diagram of an object hierarchy of the presently preferred embodiment of the present invention.

A benefit that comes from the use of objects is the ability to provide fixes and/or extensions through the use of subclasses. FIG. 4 is a simple illustration of how an object hierarchy 62 can be used to extend the capabilities or provide fixes to software loaded on the remote computer 16. In the object hierarchy 62 of FIG. 4, the base object 64 includes data and functions that are common to a large group of remote computers 16. The device object 66, a subclass from the base object 64, is more focused on a smaller group of remote computers 16 and includes data and/or functions that are more specific and focused on a narrower set of remote computers 16. As shown in FIG. 4, the device object 66 includes functions D, E and F. Functions D, E, and F all are simply wrappers for the real functions D, E, and F, which are all implemented on the remote computer 16. Functions D, E, and F are typically implemented through code of the embedded application 28. Information necessary to interface with Functions D, E, and F may be part of the exported services information.

To illustrate the usefulness of the object-oriented approach, assume that after a period of time from the initial release of the code of the remote computer 16, the functions D and F at the remote computer 16 had been altered. Function D at the remote computer 16 had been altered to provide additional error checking. Function F had been altered to fix a bug found in the earlier release. Through use of the present invention, software at the host computer 12 can be implemented to add these fixes to the remote computer 16 software without changing the code on the remote computer 16.

As shown in FIG. 4, a subclass, device extension object 68, may be derived from the device object 66. The device extension object 68 may include its own Function D that overrides the Function D of the device object 66. The new Function D may add code to implement any new changes to the function D at the remote computer 16. In this example, for instance, the new Function D may include code that provides additional error checking. Function D may also include the original code of the old Function D literally, or it may simply call the device object Function D before, during, or after its execution of the new Function D code.

The device extension object 68 may also include its own Function F that overrides the Function F of the device object 66. The new Function F may add code to implement any new changes to the function F at the remote computer 16. In this example, for instance, the new Function F may include code that fixes the bug found in the code of an earlier release of code on the remote computer 16. Function F may also include the original code of the old Function F literally, or it may simply call the device object 66 Function F before, during, or after its execution of the new Function F code. A simple example is as follows: assume that an original function F, at the remote computer 16, was to add two numbers together and store the result. Further, assume that after the code was released and shipped, it was found that in certain circumstances, the calculation was incorrect. The new Function F could add code on the host computer 12 that could adjust, compensate, and/or fix the calculation when an incorrect result was given by the old function F at the remote computer 16.

Of course, it will be appreciated that all types of extensions and/or fixes may not be able to be adequately compensated for through code on the host computer 12. The foregoing illustration is meant to show that some extensions and/or fixes may be adequately compensated for through code on the host computer 12, and the example shows how it can be accomplished.

Figure 5:
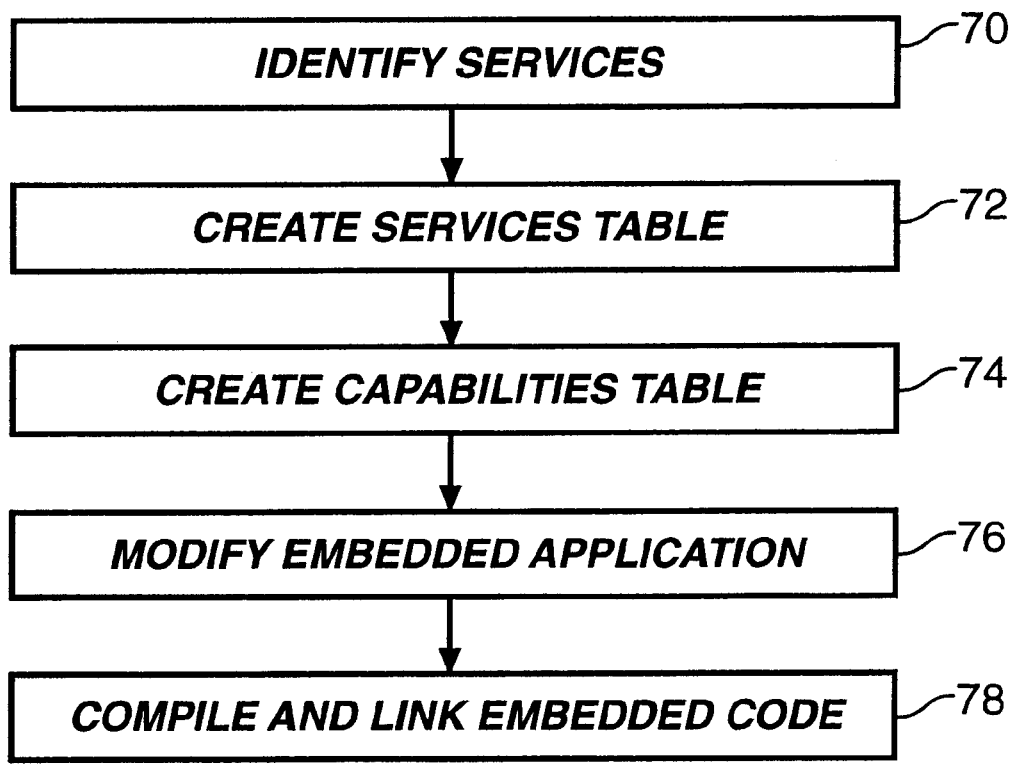
FIG. 5 is a flow diagram illustrating steps that are followed in the presently preferred embodiment of the present invention.
Figure 6:
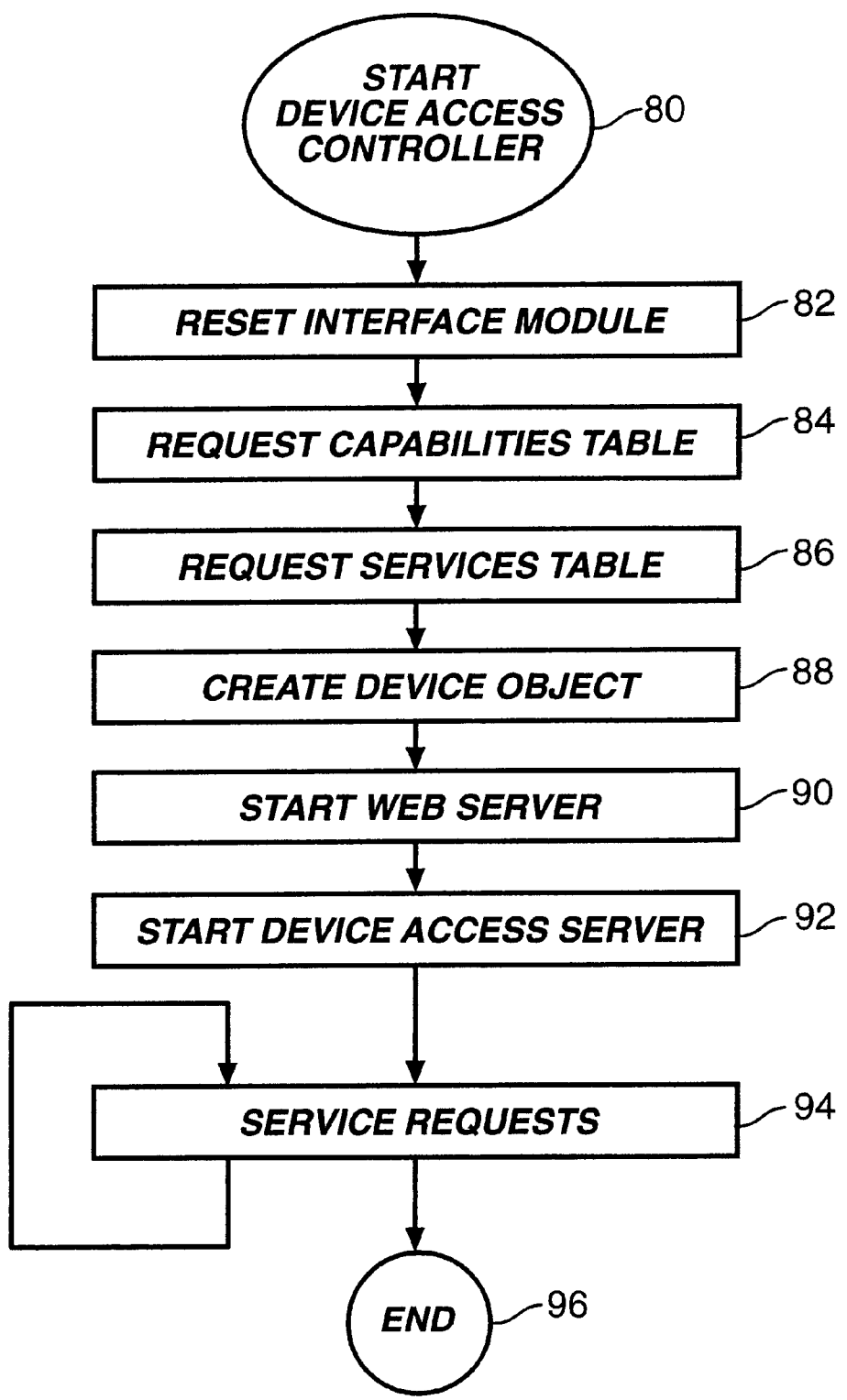
FIG. 6 is a flow diagram illustrating steps that are followed in the presently preferred embodiment of the present invention.

The presently preferred embodiment of the present invention typically involves at least two separate pieces of code, the code loaded on the remote computer 16 and the code loaded on the host computer 12. FIG. 5 is a flow diagram showing the steps that may be followed in implementing the necessary components at the remote computer 16. FIG. 6 is a flow diagram showing the steps that may be followed in implementing the necessary components at the host computer 12.

Typically, developers who wish to use the present invention have a computer system 10 including a remote computer 16 and a host computer 12. The remote computer 16 includes the external devices 18, 20 for inputs and outputs. Developers who wish to use the present invention often have an embedded application 28 that receives and processes device inputs 18 and generates outputs 20. In implementing the present invention, the developers first identify 70 the services that are to be exported to the host computer 12. The services include functions, variables, events, files, etc.

Once the services to be exported have been identified 70, a table of these services is created 72. This table 32 may be implemented in a variety of ways. For example, the services table 32 may be stored as a data structure, a file, etc. Typically the services table 32 is static, meaning that the table is usually fixed in relation to the code loaded on the remote computer 16. For example, usually the services table 32 is compiled and linked with the code that is to be loaded on the remote computer 16. However, the services table 32 could be dynamic, meaning that it could be generated and created after the code has been compiled, linked, and loaded on the remote computer 16.

In current design, a capabilities table 30 is also created 74. Similar to the services table 32, the capabilities table 30 may be either static or dynamic, and it may be stored in various ways, as will be appreciated by one skilled in the art.

The code for the remote computer 16 is then written or modified 76 to interface and communicate with the software running or to be run on the host computer 12. As shown in FIGS. 2 and 3, a separate embedded interface module 34 may be written. This embedded interface module 34 may be written so as to respond to various requests that may be received from the software at the host computer 12. By creating a separate interface module 34, the embedded application 28 may maintain focus on the services of the remote computer 16. In current design, the embedded application 28 is typically modified to make a function call into the embedded interface module 34 within its main operation loop to provide time for responding to requests from the host computer 12. The embedded interface module 34 performs some processing, and then returns back to the main operation loop. The interface module 34 should return control to the main operation loop within a short enough period of time so that the main operation loop will not miss any necessary events and/or processing.

In an alternative preferred embodiment, the embedded interface module 34 could be called by an interrupt service routine that is called periodically.

As also shown in FIGS. 2 and 3, a separate communications module 38 may be created to handle communications of data to and from the communications port 36.

Once the necessary changes have been made to the code of the remote computer 16, the code is then compiled 78 and linked together, and then loaded on the remote computer 16. Of course, it will be appreciated by one skilled in the art that the various source files could be compiled at different times, and then linked and loaded onto the remote computer 16.

FIG. 6 is a flow diagram showing the steps that may be followed in implementing the necessary components at the host computer 12. Of course, different steps could be implemented to practice the present invention. The steps of FIG. 6 are illustrative of the principles of the present invention and are not meant to be limiting as to the breadth of the principles taught herein. To initiate the operation of software of the presently preferred embodiment of the present invention on the host computer 12, a user may start 80 the device access controller 46. The device access controller 46, in current design, includes the communication module 42 for communicating with the remote computer 16.

In current design, the device access controller 46 resets 82 the embedded interface module 34 to a known state. This includes resetting any state variables, data, etc. In the presently preferred embodiment, the embedded interface module 34 acknowledges the reset by sending an acknowledgment back to the device access controller 46.

The access controller 46 also requests 84 the capabilities table 30 from the remote computer 16. Through the capabilities table 30, the software running at the host computer 12 becomes aware of what capabilities the remote computer 16 has.

The access controller 46 also requests 86 the services table 32 from the remote computer 16. By obtaining the services table 32, the software at the host computer 12 is able to create and maintain exported services information 44 about particular services at the remote computer 16. The host computer 12 may then present this information to a user at the host computer 12 or to client software requesting such information.

As explained above, the present invention may be implemented using object-oriented techniques. If a user wishes to use object-oriented techniques, a device object 56 may be created 88. This device object 56 may encapsulate all or some of the information retrieved from the services table 32.

Any servers to be used at the host computer 12 in servicing requests from clients 22 need to be started. For example, a web server 48 could be started 90 to service requests from web browsers at client computers 22. In addition, or in the alternative, a device access server 50 could be started 92 for providing access to information about the remote computer 16 and also in providing access to the remote computer 16. As shown in FIGS. 2 and 3, a client application 52 and/or a device access client 54 may be started on client computers 22. Once the software is running at the host computer 12, it acts to service 94 requests it receives. The software will typically continue servicing 94 requests until the software stops 96 running.

Figure 7:
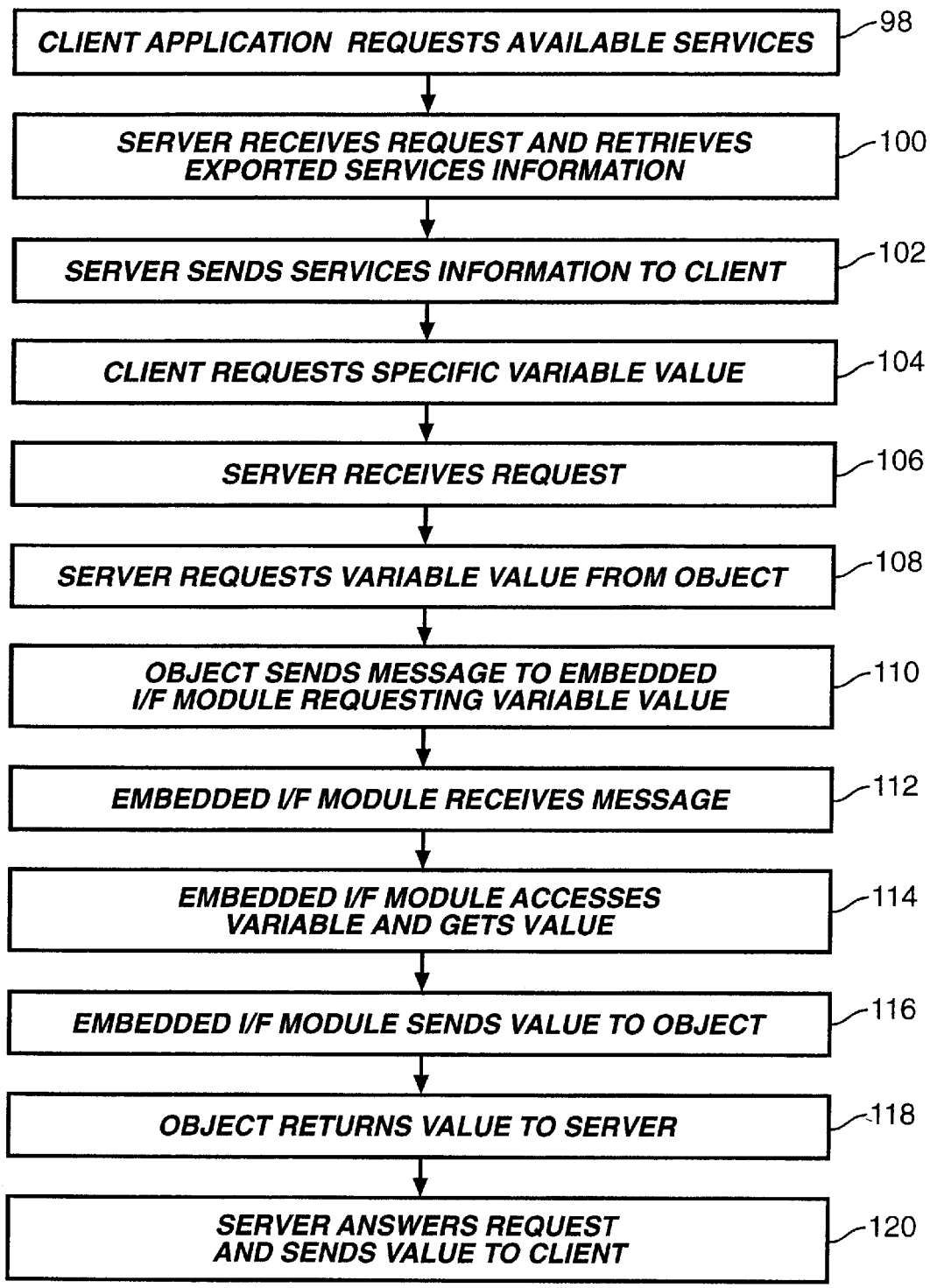
FIG. 7 is a flow diagram illustrating steps that are followed in the presently preferred embodiment of the present invention.

FIG. 7 depicts a flow diagram of the scenario of getting a variable value from the remote computer 16. FIG. 7 tracks the software components as shown in FIGS. 2 and 3. However, it will be appreciated by one skilled in the art that the steps of FIG. 7 could easily be modified for use with a different software component architecture that implements the principles of the present invention as contained herein. The principles illustrated and described in relation to FIG. 7 can be used in accessing other services of the remote computer 16.

Unless a client application 52 is already aware of the services at the remote computer 16, it 52 first usually requests 98 a list of available services. The server, either the web server 48, the device access server 50, or similar server, receives 100 the request and retrieves the exported service information from the device object 56. If the particular implementation of the present invention is not using an object-oriented approach, the server could either retrieve the exported service information directly from the exported service information 44, or from a function designed and implemented to return such information.

The server then sends 102 the services information to the client 52. Once the client knows what services are available at the remote computer 16, it may request certain data and/or actions relating to the services. As shown in FIG. 7, the client may request 104 a specific variable value. A user, through client software 52, may request a specific variable value from the remote computer 16 to know the state of events or data at the remote computer 16. For example, the remote computer 16 may be in electronic communication with a temperature sensor, and may store the temperature sensor data in a variable. A user may wish to know what that variable value is so as to know what temperature is being sensed at the remote computer 16.

The server receives 106 the request for a particular value and may request 108 the variable from the appropriate device object 56, or functionally equivalent software. The object 56, upon receiving this request, sends 110 a message to the embedded interface module 34 requesting this value. The hardware and software communication pathway between the host computer and remote computer may be as shown and described in relation to FIGS. 2 and 3.

Upon its next call for processing, the embedded interface module 34 receives 112 the message and accesses 114 the variable and reads the value contained therein. After retrieving the variable value, the embedded interface module 34 sends 116 the value back to the object 56 through the communication pathway. Once the object 56 has received the value, it returns 118 the value to the server. The server then answers 120 the request from the client and sends the variable value to the client software.

If an object hierarchy were being utilized to extend the capabilities of the object, as discussed in relation to FIG. 4, the object 56 may provide further processing on the data before it returns the data to the server. For example, a subclass component may alter the view, or modify the value, of the retrieved variable. The variable or value retrieve function, in the form of a retrieve or get operation on the object 56, may be overridden in the subclass into a retrieve or get operation which includes performing code that may alter the value of the variable. First, the get operation calls the get operation from the base class in order to retrieve the value from the remote computer. After the value has been retrieved from the remote computer, the get operation may then execute a function or instructions to alter the value. The get or retrieve operation of the subclass component is viewed the same as the one in the base class, but additions and extensions stored on the host have enhanced the device object.

In the presently preferred embodiment of the present invention, commercially available software from emWare, Inc. is used in implementing the present invention. emWare, Inc. may be contacted through its web site at http://www.emware.com. One skilled in the art will appreciate how the commercially availably software items from emWare can be used with the present invention. The following is a general and basic description of technology of emWare that is used in the presently preferred embodiment of the present invention.

emWare's business centers around microcontrollers that manage many electronic devices used in today's world, including telephones, home appliances, office equipment, ATMs, security systems, VCRs, automobiles, etc. These microcontrollers are embedded into millions of intelligent electronic devices.

emWare has developed technology and software which provide distributed network-based device control. emWare's Embedded Micro Internetworking Technology (EMIT) software is designed to move the majority of software off of the embedded microcontroller and distribute it to more capable computers over a network. EMIT has also been developed to leverage existing Internet technologies.

Use of EMIT software involves various components including the following: the customer's embedded application 28, emMicro software (which correlates to the embedded interface module 34), emGateway software, emNet software (which correlates to the communication modules 38 and 42), and the customer's monitoring/controlling application 52. Typically, potential customers of emWare already have embedded environments in which they plan to deploy emWare's EMIT software to enhance their monitoring and controlling capabilities. These embedded environments typically include the embedded system 14, the host computer 12, and client computers 22.

emMicro is used in the presently preferred embodiment of the present invention on the remote computer 16 for relaying service information from the remote computer 16 to the host computer 12. Service information is information about the functions, variables, events and files of the embedded application 28 running on the remote computer 16.

The communications between the host computer 12 and the remote computer 16 running emMicro are usually accomplished via a lightweight network such as RS232, RS484, RF, or IR. The emNet component is responsible for handling communications between emMicro and the software on the host computer 12.

From the above discussion, it will be appreciated that the present invention distributes services of an embedded system across a larger computer system. In addition, the present invention increases the functionality of an embedded system by allowing functionality to be distributed across a computer system. The present invention also increases the effective storage capability of data related to the embedded system by allowing this data to be stored on the host computer. Moreover, the present invention increases the ease of interfacing and communicating with a remote computer by encapsulating services information and exposing it to client applications thereby making the services of the remote computer easier to access and interact with.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A distributed object hierarchy for use in a networked computer system including a host computer and a remote computer, the remote computer being in electronic communication with a device, said distributed object hierarchy comprising:

a first object implemented on the host computer, the first object being an instantiation of a base class, the base class defining a set of methods that relate to a plurality of devices;

a second object implemented on the remote computer, the second object being an instantiation of a device class which is a subclass of the base class thereby inheriting the set of methods of the base class, where access to the set of methods is accomplished through communication with the host computer, the device class extending the base class with device-specific methods; and a third object implemented on the host computer, the third object being an instantiation of a device extension class which is a subclass of the device class thereby inheriting the set of methods available through the device class, the device extension class refining the device class with modifications of the set of methods of the device class and adding extension device-specific methods.

2. The distributed object hierarchy of claim 1, wherein the remote computer further comprises a services list comprising information of certain services.

3. The distributed object hierarchy of claim 2, wherein the distributed object hierarchy further comprises an enumeration of exported services, said exported services being a subset of said services.

4. The distributed object hierarchy of claim 1, further comprising a client computer networked to the host computer, and wherein the client computer comprises a monitoring application that monitors the remote computer using the distributed object hierarchy.

5. The distributed object hierarchy of claim 1, wherein the remote computer is an embedded computer.

6. A distributed object hierarchy for use in a networked computer system including a host computer and a remote computer, the remote computer being in electronic communication with a device, said distributed object hierarchy comprising:

a first object implemented on the host computer, the first object being an instantiation of a base class, the base class defining a set of methods that relate to a plurality of devices; and a second object implemented on the remote computer, the second object being an instantiation of a device class which is a subclass of the base class thereby inheriting the set of methods of the base class, where access to the set of methods is accomplished through communication with the host computer, the device class extending the base class with device-specific methods.

7. The distributed object hierarchy of claim 6, wherein the remote computer further comprises a services list comprising information of certain services.

8. The distributed object hierarchy of claim 7, wherein the distributed object hierarchy further comprises an enumeration of exported services, said exported services being a subset of said services.

9. The distributed object hierarchy of claim 6, further comprising a client computer networked to the host computer, and wherein the client computer comprises a monitoring application that monitors the remote computer using the distributed object hierarchy.

10. The distributed object hierarchy of claim 6, wherein the remote computer is an embedded computer.

11. A distributed object hierarchy for use in a networked computer system including a host computer and a remote computer, the remote computer being in electronic communication with a device, said distributed object hierarchy comprising:

a first object implemented on the host computer, the first object being an instantiation of a class, the class defining a set of methods that relate to a plurality of devices;

a second object implemented on the remote computer, the second object being an instantiation of a device class which is a client of the first object thereby using the set of methods of the first object, where access to the set of methods is accomplished through communication with the host computer, the device class implementing device-specific methods using the first object's methods; and a third object implemented on the host computer, the third object being an instantiation of a device extension class which is a client of the second object thereby using the set of methods of the second object.

12. The distributed object hierarchy of claim 11, wherein the device extension class refines the device class with modifications of the set of methods of the device class.

13. The distributed object hierarchy of claim 12, wherein the device extension class adds extension device-specific methods.

14. The distributed object hierarchy of claim 11, wherein the remote computer further comprises a services list comprising information of certain services.

15. The distributed object hierarchy of claim 14, wherein the distributed object hierarchy further comprises an enumeration of exported services, said exported services being a subset of said services.

16. The distributed object hierarchy of claim 11, further comprising a client computer networked to the host computer, and wherein the client computer comprises a monitoring application that monitors the remote computer using the distributed object hierarchy.

17. The distributed object hierarchy of claim 11, wherein the remote computer is an embedded computer.

18. A distributed object hierarchy for use in a networked computer system including a host computer and a remote computer, the remote computer being in electronic communication with a device, said distributed object hierarchy comprising:

a first object implemented on the host computer, the first object being an instantiation of a base class, the base class defining a set of attributes that relate to a plurality of devices;

a second object implemented on the remote computer, the second object being an instantiation of a device class which is a subclass of the base class thereby inheriting the set of attributes of the base class, where access to the set of attributes is accomplished through communication with the host computer, the device class extending the base class with device-specific attributes; and a third object implemented on the host computer, the third object being an instantiation of a device extension class which is a subclass of the device class thereby inheriting the set of attributes available through the device class, the device extension class refining the device class with modifications of the set of attributes of the device class and adding extension device-specific attributes.

19. The distributed object hierarchy of claim 18, wherein the remote computer further comprises a services list comprising information of certain services.

20. The distributed object hierarchy of claim 19, wherein the distributed object hierarchy further comprises an enumeration of exported services, said exported services being a subset of said services.

21. The distributed object hierarchy of claim 18, further comprising a client computer networked to the host computer, and wherein the client computer comprises a monitoring application that monitors the remote computer using the distributed object hierarchy.

22. The distributed object hierarchy of claim 18, wherein the remote computer is an embedded computer.

23. A distributed object hierarchy for use in a networked computer system including a host computer and a remote computer, the remote computer being in electronic communication with a device, said distributed object hierarchy comprising:

a first object implemented on the host computer, the first object being an instantiation of a base class, the base class defining a set of attributes that relate to a plurality of devices; and a second object implemented on the remote computer, the second object being an instantiation of a device class which is a subclass of the base class thereby inheriting the set of attributes of the base class, where access to the set of attributes is accomplished through communication with the host computer, the device class extending the base class with device-specific attributes.

24. The distributed object hierarchy of claim 23, wherein the remote computer further comprises a services list comprising information of certain services.

25. The distributed object hierarchy of claim 24, wherein the distributed object hierarchy further comprises an enumeration of exported services, said exported services being a subset of said services.

26. The distributed object hierarchy of claim 23, further comprising a client computer networked to the host computer, and wherein the client computer comprises a monitoring application that monitors the remote computer using the distributed object hierarchy.

27. The distributed object hierarchy of claim 23, wherein the remote computer is an embedded computer.

28. A distributed object hierarchy for use in a networked computer system including a host computer and a remote computer, the remote computer being in electronic communication with a device, said distributed object hierarchy comprising:

a first object implemented on the host computer, the first object being an instantiation of a class, the class defining a set of attributes that relate to a plurality of devices;

a second object implemented on the remote computer, the second object being an instantiation of a device class which is a client of the first object thereby using the set of attributes of the first object, where access to the set of attributes is accomplished through communication with the host computer, the device class implementing device-specific attributes using the first object's attributes; and a third object implemented on the host computer, the third object being an instantiation of a device extension class which is a client of the second object thereby using the set of attributes of the second object.

29. The distributed object hierarchy of claim 28, wherein the device extension class refines the device class with modifications of the set of attributes of the device class.

30. The distributed object hierarchy of claim 29, wherein the device extension class adds extension device-specific attributes.

31. The distributed object hierarchy of claim 28, wherein the remote computer further comprises a services list comprising information of certain services.

32. The distributed object hierarchy of claim 28, wherein the distributed object hierarchy further comprises an enumeration of exported services, said exported services being a subset of said services.

33. The distributed object hierarchy of claim 28, further comprising a client computer networked to the host computer, and wherein the client computer comprises a monitoring application that monitors the remote computer using the distributed object hierarchy.

34. The distributed object hierarchy of claim 28, wherein the remote computer is an embedded computer.

35. A distributed object hierarchy for use in a networked computer system including a host computer and a remote computer, the remote computer being in electronic communication with a device, said distributed object hierarchy comprising:

a first object implemented on the host computer, the first object being an instantiation of a base class, the base class defining a set of methods and attributes that relate to a plurality of devices; and a second object implemented on the remote computer, the second object being an instantiation of a device class which is a subclass of the base class thereby inheriting the set of methods and attributes of the base class, where access to the set of methods and attributes is accomplished through communication with the host computer, the device class extending the base class with device-specific methods and device-specific attributes.

36. The distributed object hierarchy of claim 35, wherein the remote computer further comprises a services list comprising information of certain services.

37. The distributed object hierarchy of claim 36, wherein the distributed object hierarchy further comprises an enumeration of exported services, said exported services being a subset of said services.

38. The distributed object hierarchy of claim 35, further comprising a client computer networked to the host computer, and wherein the client computer comprises a monitoring application that monitors the remote computer using the distributed object hierarchy.

39. The distributed object hierarchy of claim 35, wherein the remote computer is an embedded computer.

40. A distributed object hierarchy for use in a networked computer system including a host computer and a remote computer, the remote computer being in electronic communication with a device, said distributed object hierarchy comprising:

a first object implemented on the host computer, the first object being an instantiation of a class, the class defining a set of methods and attributes that relate to a plurality of devices;

a second object implemented on the remote computer, the second object being an instantiation of a device class which is a client of the first object thereby using the set of methods and attributes of the first object, where access to the set of methods and attributes is accomplished through communication with the host computer, the device class implementing device-specific methods and device-specific attributes using the first object's methods; and a third object implemented on the host computer, the third object being an instantiation of a device extension class which is a client of the second object thereby using the set of methods and attributes of the second object.

41. The distributed object hierarchy of claim 40, wherein the device extension class refines the device class with modifications of the set of methods and attributes of the device class.

42. The distributed object hierarchy of claim 41, wherein the device extension class adds extension device-specific methods and extension device-specific attributes.

43. The distributed object hierarchy of claim 40, wherein the remote computer further comprises a services list comprising information of certain services.

44. The distributed object hierarchy of claim 43, wherein the distributed object hierarchy further comprises an enumeration of exported services, said exported services being a subset of said services.

45. The distributed object hierarchy of claim 40, further comprising a client computer networked to the host computer, and wherein the client computer comprises a monitoring application that monitors the remote computer using the distributed object hierarchy.

46. The distributed object hierarchy of claim 40, wherein the remote computer is an embedded computer.

47. A distributed object hierarchy for use in a networked computer system including a host computer and a remote computer, the remote computer being in electronic communication with a device, said distributed object hierarchy comprising:

a first object implemented on the host computer, the first object being an instantiation of a base class, the base class defining a set of methods;

a second object implemented on the remote computer, the second object being an instantiation of a device class which is a subclass of the base class thereby inheriting the set of methods of the base class, where access to the set of methods is accomplished through communication with the host computer, the device class extending the base class with device-specific methods; and a third object implemented on the host computer, the third object being an instantiation of a device extension class which is a subclass of the device class thereby inheriting the set of methods available through the device class, the device extension class refining the device class with modifications of the set of methods of the device class and adding extension device-specific methods.

48. The distributed object hierarchy of claim 47, wherein the remote computer further comprises a services list comprising information of certain services.

49. The distributed object hierarchy of claim 48, wherein the distributed object hierarchy further comprises an enumeration of exported services, said exported services being a subset of said services.

50. The distributed object hierarchy of claim 47, further comprising a client computer networked to the host computer, and wherein the client computer comprises a monitoring application that monitors the remote computer using the distributed object hierarchy.

51. The distributed object hierarchy of claim 47, wherein the remote computer is an embedded computer.

52. A distributed object hierarchy for use in a networked computer system including a host computer and a remote computer, the remote computer being in electronic communication with a device, said distributed object hierarchy comprising:

a first object implemented on the host computer, the first object being an instantiation of a base class, the base class defining a set of methods; and a second object implemented on the remote computer, the second object being an instantiation of a device class which is a subclass of the base class thereby inheriting the set of methods of the base class, where access to the set of methods is accomplished through communication with the host computer, the device class extending the base class with device-specific methods.

53. The distributed object hierarchy of claim 52, wherein the remote computer further comprises a services list comprising information of certain services.

54. The distributed object hierarchy of claim 53, wherein the distributed object hierarchy further comprises an enumeration of exported services, said exported services being a subset of said services.

55. The distributed object hierarchy of claim 52, further a client computer networked to the host computer, and wherein the client computer comprises a monitoring application that monitors the remote computer using the distributed object hierarchy.

56. The distributed object hierarchy of claim 52, wherein the remote computer is an embedded computer.

57. A distributed object hierarchy for use in a networked computer system including a host computer and a remote computer, the remote computer being in electronic communication with a device, said distributed object hierarchy comprising:

a first object implemented on the host computer, the first object being an instantiation of a class, the class defining a set of methods;

a second object implemented on the remote computer, the second object being an instantiation of a device class which is a client of the first object thereby using the set of methods of the first object, where access to the set of methods is accomplished through communication with the host computer, the device class implementing device-specific methods using the first object's methods; and a third object implemented on the host computer, the third object being an instantiation of a device extension class which is a client of the second object thereby using the set of methods of the second object.

58. The distributed object hierarchy of claim 57, wherein the device extension class refines the device class with modifications of the set of methods of the device class.

59. The distributed object hierarchy of claim 58, wherein the device extension class adds extension device-specific methods.

60. The distributed object hierarchy of claim 57, wherein the remote computer further comprises a services list comprising information of certain services.

61. The distributed object hierarchy of claim 60, wherein the distributed object hierarchy further comprises an enumeration of exported services, said exported services being a subset of said services.

62. The distributed object hierarchy of claim 57, further comprising a client computer networked to the host computer, and wherein the client computer comprises a monitoring application that monitors the remote computer using the distributed object hierarchy.

63. The distributed object hierarchy of claim 57, wherein the remote computer is an embedded computer.

64. A distributed object hierarchy for use in a networked computer system including a host computer and a remote computer, the remote computer being in electronic communication with a device, said distributed object hierarchy comprising:
- a first object implemented on the host computer, the first object being an instantiation of a base class, the base class defining a set of attributes;
- a second object implemented on the remote computer, the second object being an instantiation of a device class which is a subclass of the base class thereby inheriting the set of attributes of the base class, where access to the set of attributes is accomplished through communication with the host computer, the device class extending the base class with device-specific attributes; and
- a third object implemented on the host computer, the third object being an instantiation of a device extension class which is a subclass of the device class thereby inheriting the set of attributes available through the device class, the device extension class refining the device class with modifications of the set of attributes of the device class and adding extension device-specific attributes.

65. The distributed object hierarchy of claim 64, wherein the remote computer further comprises a services list comprising information of certain services.

66. The distributed object hierarchy of claim 65, wherein the distributed object hierarchy further comprises an enumeration of exported services, said exported services being a subset of said services.

67. The distributed object hierarchy of claim 64, further comprising a client computer networked to the host computer, and wherein the client computer comprises a monitoring application that monitors the remote computer using the distributed object hierarchy.

68. The distributed object hierarchy of claim 64, wherein the remote computer is an embedded computer.

69. A distributed object hierarchy for use in a networked computer system including a host computer and a remote computer, the remote computer being in electronic communication with a device, said distributed object hierarchy comprising:
- a first object implemented on the host computer, the first object being an instantiation of a base class, the base class defining a set of attributes; and
- a second object implemented on the remote computer, the second object being an instantiation of a device class which is a subclass of the base class thereby inheriting the set of attributes of the base class, where access to the set of attributes is accomplished through communication with the host computer, the device class extending the base class with device-specific attributes.

70. The distributed object hierarchy of claim 69, wherein the remote computer further comprises a services list comprising information of certain services.

71. The distributed object hierarchy of claim 70, wherein the distributed object hierarchy further comprises an enumeration of exported services, said exported services being a subset of said services.

72. The distributed object hierarchy of claim 69, further comprising a client computer networked to the host computer, and wherein the client computer comprises a monitoring application that monitors the remote computer using the distributed object hierarchy.

73. The distributed object hierarchy of claim 69, wherein the remote computer is an embedded computer.

74. A distributed object hierarchy for use in a networked computer system including a host computer and a remote computer, the remote computer being in electronic communication with a device, said distributed object hierarchy comprising:
- a first object implemented on the host computer, the first object being an instantiation of a class, the class defining a set of attributes;
- a second object implemented on the remote computer, the second object being an instantiation of a device class which is a client of the first object thereby using the set of attributes of the first object, where access to the set of attributes is accomplished through communication with the host computer, the device class implementing device-specific attributes using the first object's attributes; and
- a third object implemented on the host computer, the third object being an instantiation of a device extension class which is a client of the second object thereby using the set of attributes of the second object.

75. The distributed object hierarchy of claim 74, wherein the device extension class refines the device class with modifications of the set of attributes of the device class.

76. The distributed object hierarchy of claim 75, wherein the device extension class adds extension device-specific attributes.

77. The distributed object hierarchy of claim 74, wherein the remote computer further comprises a services list comprising information of certain services.

78. The distributed object hierarchy of claim 77, wherein the distributed object hierarchy further comprises an enumeration of exported services, said exported services being a subset of said services.

79. The distributed object hierarchy of claim 74, further comprising a client computer networked to the host computer, and wherein the client computer comprises a monitoring application that monitors the remote computer using the distributed object hierarchy.

80. The distributed object hierarchy of claim 74, wherein the remote computer is an embedded computer.

81. A distributed object hierarchy for use in a networked computer system including a host computer and a remote computer, the remote computer being in electronic communication with a device, said distributed object hierarchy comprising:
- a first object implemented on the host computer, the first object being an instantiation of a base class, the base class defining a set of methods and attributes; and
- a second object implemented on the remote computer, the second object being an instantiation of a device class which is a subclass of the base class thereby inheriting the set of methods and attributes of the base class, where access to the set of methods and attributes is accomplished through communication with the host computer, the device class extending the base class with device-specific methods and device-specific attributes.

82. The distributed object hierarchy of claim 81, wherein the remote computer further comprises a services list comprising information of certain services.

83. The distributed object hierarchy of claim 82, wherein the distributed object hierarchy further comprises an enumeration of exported services, said exported services being a subset of said services.

84. The distributed object hierarchy of claim 81, further comprising a client computer networked to the host computer, and wherein the client computer comprises a monitoring application that monitors the remote computer using the distributed object hierarchy.

85. The distributed object hierarchy of claim 81, wherein the remote computer is an embedded computer.

86. A distributed object hierarchy for use in a networked computer system including a host computer and a remote computer, the remote computer being in electronic communication with a device, said distributed object hierarchy comprising:
- a first object implemented on the host computer, the first object being an instantiation of a class, the class defining a set of methods and attributes;
- a second object implemented on the remote computer, the second object being an instantiation of a device class which is a client of the first object thereby using the set of methods and attributes of the first object, where access to the set of methods and attributes is accomplished through communication with the host computer, the device class implementing device-specific methods and device-specific attributes using the first object's methods and attributes; and
- a third object implemented on the host computer, the third object being an instantiation of a device extension class which is a client of the second object thereby using the set of methods and attributes of the second object.

87. The distributed object hierarchy of claim 86, wherein the device extension class refines the device class with modifications of the set of methods and attributes of the device class.

88. The distributed object hierarchy of claim 87, wherein the device extension class adds extension device-specific methods and extension device-specific attributes.

89. The distributed object hierarchy of claim 86, wherein the remote computer further comprises a services list comprising information of certain services.

90. The distributed object hierarchy of claim 89, wherein the distributed object hierarchy further comprises an enumeration of exported services, said exported services being a subset of said services.

91. The distributed object hierarchy of claim 86, further comprising a client computer networked to the host computer, and wherein the client computer comprises a monitoring application that monitors the remote computer using the distributed object hierarchy.

92. The distributed object hierarchy of claim 86, wherein the remote computer is an embedded computer.

93. A distributed object hierarchy for use in a networked computer system including a host computer and a remote computer, the remote computer being in electronic communication with a device, said distributed object hierarchy comprising:
- a first object implemented on the host computer, the first object being an instantiation of a first class, the first class defining a set of first methods and first attributes;
- a second object implemented on the host computer, the second object being an instantiation of a second class, the second class defining a set of second methods and second attributes;
- a third object implemented on the remote computer, the third object being an instantiation of a device class which is a client of the first object and a client of the second object thereby using the set of first methods and first attributes of the first object and using the set of second methods and second attributes of the second object, where access to the sets of first and second methods and first and second attributes is accomplished through communication with the host computer, the device class implementing device-specific methods and device-specific attributes using the first object's methods; and
- a third object implemented on the host computer, the third object being an instantiation of a device extension class which is a client of the second object thereby using the set of methods and attributes of the second object.

* * * * *